| United States Patent [19] | [11] | 4,386,142 |
|---|---|---|
| Hodes et al. | [45] | May 31, 1983 |

[54] SURFACE TREATMENT OF SEMICONDUCTOR MATERIALS

[75] Inventors: Gary Hodes; Joost Manassen; David Cahen, all of Rehovot, Israel

[73] Assignee: Yeda Research and Development Company, Rehovot, Israel

[21] Appl. No.: 196,481

[22] Filed: Oct. 14, 1980

[30] Foreign Application Priority Data

Oct. 11, 1979 [IL] Israel ..................................... 58441

[51] Int. Cl.³ ...................... H01M 6/36; H01L 31/00
[52] U.S. Cl. .................................. 429/111; 204/129.2; 204/129.3; 204/DIG. 3; 204/29.95; 204/290 R; 427/74; 427/76; 136/260; 136/264; 357/30
[58] Field of Search ............ 204/129.3, 129.2, 129.75, 204/129.95, DIG. 3, 290 R; 429/111; 427/74, 76; 136/260, 264; 357/30

[56] References Cited

U.S. PATENT DOCUMENTS

| 3,706,645 | 12/1972 | Lasser ........................... 204/143 GE |
| 4,084,044 | 4/1978 | Heller et al. ........................ 429/111 |
| 4,094,751 | 6/1978 | Nozik ..................................... 204/80 |
| 4,118,548 | 10/1978 | Chang et al. ......................... 429/111 |

FOREIGN PATENT DOCUMENTS

| 1193335 | 5/1965 | Fed. Rep. of Germany ... 204/129.3 |
| 2381390 | 9/1978 | France ................................. 429/111 |

OTHER PUBLICATIONS

R. Memming, "The Role of Energy Levels In Semiconductor-Electrolyte Solar Cells," *J. Electrochem. Soc.*, vol. 125, pp. 117–123, (1978).

C. Vazquez–Lopez et al., "Study of the Interface Changes During Operation of nCdTe–Electrolyte Solar Cells", *J. Appl. Phys.*, vol. 50, pp. 5391–5396, (1979).

Y. Avigal et al., "Solar Energy Conversion & Storage by a Photoelectrochemical Storage Cell", *Proceedings, Int'l. Photovoltaic Solar Energy Conf.*, Luxembourg, (1977), Reidel Pub. Co. (1978), pp. 1302–1308.

Hollan, L., et al., "Interpretation of Selective Etching of III–IV Compounds on the Basis of Semiconductor Electrochemistry" *Journal of the Electrochemical Society*, vol. 26, No. 5, May 1979, pp. 855–859.

Menezes, C., et al., "Photoelectronic Properties of CdTe Electrolyte Heterojunctions: Feasibility as Solar Energy Converters" *Applied Physics Letters*, vol. 31, No. 1, Jul. 1, 1977, pp. 16–18.

*Primary Examiner*—Aaron Weisstuch
*Attorney, Agent, or Firm*—Sandler & Greenblum

[57] ABSTRACT

A process for preparing the surface of a metal chalcogenide. The metal chalcogenide is immersed in a suitable electrolyte. The electrolyte is selected such that the metal chalcogenide is relatively stable therein in the dark, but unstable as a photoelectrode under illumination. The metal chalcogenide is connected to another electrode; and the electrode is immersed in the electrolyte. The metal chalcogenide is illuminated to photoetch the chalcogenide thereby improving the surface electronic properties of the semiconductor.

A process for the surface treatment of metal chalcogenides including immersing the metal chalcogenide in an aqueous solution containing Zn and/or Cr ions.

29 Claims, No Drawings

SURFACE TREATMENT OF SEMICONDUCTOR MATERIALS

BACKGROUND OF THE INVENTION

1. Field of the Invention

The invention relates to a process for the photoelectrochemical etching of semiconductors and to the specific metal-ion treatment of the semiconductors, which can also be used in photoelectrochemical cells or as photovoltaic cells in solid-state applications.

2. Description of Prior Art

Semiconductors are commonly etched for purposes of improving the surface of the semiconductors. Although etching may serve many purposes, there are two primary areas in which etching is useful. First, etching serves to remove "damaged" surface layers from semiconductors. Second, in "geometrically selective etching", a specific geometric pattern is produced on the semiconductor.

The removal of damaged surface layers by etching is useful in preparing photovoltaic devices in which damaged or less perfect (less than the bulk) surfaces may give rise to undesirable surface states resulting in lowered output parameters, particularly photovoltage and fill factor, and having fewer surface recombination centers, which results primarily in reduced photocurrent. For such uses, the etchant is normally a reagent which attacks the semiconductor chemically, such as by dissolving it or by oxidizing it to form products which are subsequently dissolved at a controlled rate. In this context, particular attention is directed to the exhaustive etching of GaAs crystals disclosed by B. A. Parkinson, A. Heller and B. Miller, *Applied Physics Letters* 33(6) 521 (1976) by nonconvective etching with $H_2O_2/H_2SO_4$. By using this technique an initially shiny crystal face is converted to a matte non-reflecting surface. As was noted above, this is particularly desirable for photovoltaic applications where matte surfaces reduce light reflection and hence result in higher photocurrents as a result of increased light absorption. Additionally, the treatment of the etched GaAs with ruthenium ions has been shown to increase both the photovoltage and fill factor of a photoelectrochemical cell utilizing the GaAs as a photoanode in a polyselenide electrolyte.

Geometrically selective etching is often radiation induced and, although related to the method of the invention, is performed for a different purpose such as recording holographic data or forming diffraction patterns. Thus, in 1956, A. Uhlir [Bell System Tech. J. Vol. 35,33 (1956)] first reported electrolyte shaping of Ga and Si by localized illumination to inject carriers in a geometrically controlled fashion and was able to produce a pattern of concentric dimples. In 1966, Yu. V. Pleskov (U.S.S.R. Patent 190,758) selectively cut n-GaAs crystals by photoelectrochemically etching them to obtain a desired surface profile.

Hologram recordings on a polished Si surface were reported by A. L. Delisa et al [Appl. Phys. Letts. 17, 208 (1970)], and were performed by photoanodically etching the Si surface in a 5% aqueous HF solution. Diffraction patterns on n- and p- crystals and on AlGaAs epitaxial layers, were formed by forming a two beam interference pattern from an HeNe laser onto a semiconductor surface which was etched at the same time with an aqueous solution of an oxidizing agent [L. V. Belyakov et al, Soviet Phys. Tech. Phys. 19, 837 (1974)]. Hologram recordings were effected in CdSe sputtered films on glass by a photoetch process wherein the CdSe film was illuminated by a laser in aqueous $HNO_3$ or $K_3Fe(CN)_6$ solution [Sterligov, V. A. and Tygai, V. A., Soviet Tech. Phys. Letts. 1, (1975)].

Finally, P. D. Greene studied the photoelectrochemical etching of GaAs by $Fe^{+3}$ based etches and found that n-GaAs was etched preferentially compared with p-GaAs and that the rate of etching of n-GaAs depended on the doping concentration [Inst. Phys. Conf. Ser. No. 33A, 141 (1977)].

SUMMARY OF THE INVENTION

It is, therefore, an object of the invention to provide a process for preparing the surface of a semiconductor body, particularly a metal chalcogenide, for use as an electrode in a photovoltaic device. According to the process, the metal chalcogenide is immersed in a suitable electrolyte for etching. The electrolyte is selected such that the metal chalcogenide is relatively stable therein in the dark, but unstable under illumination when forming a circuit with a counter-electrode. The metal chalcogenide is electrically connected to an electrode and both are immersed in the electrolyte.

The metal chalcogenide is then illuminated to photoetch the metal chalcogenide thereby improving the surface electronic properties of the chalcogenide and generally providing a matte surface thereon. The intensity of illumination is generally on the order of sunlight.

The above process may be applied to a metal chalcogenide which internally comprises the electrode and wherein the metal chalcogenide is thus automatically electrically connected to the electrode.

Thus, the metal chalcogenide may be in the form of a powder, each particle of which comprises cathodic and anodic sites exposed to said electrolyte.

In one embodiment, the pretreatment electrolyte used may be a dilute acid, and is preferably selected from the group comprising of $H_2SO_4$, HCl, $HNO_3$ and mixtures thereof.

According to one aspect of the invention, at least one of the ions selected from the group consisting of $Ce^{4+}$, $Sn^{2+}$, $Sn^{4+}$, $Zn^{2+}$, $Cr^{6+}$ or $Fe(CN)_6^{4-}$, $Fe(CN)_6^{3-}$ may be added to the electrolyte. As used, the term "ions" is taken to include both the simple and complex forms of the elements having the recited valences. Thus, for example, $CrO_4^=$ is included as a complex ion of $Cr^{6+}$.

The metal chalcogenide is preferably selected from the group comprising cadmium, mercury or zinc chalcogenides, alloys of the cadmium, mercury or zinc chalcogenides, and chalcopyrite structured ternary compounds such as $CuInS_2$ and $CuInSe_2$. The chalcogenides are most preferably selected from the group consisting of sulfides, selenides, tellurides and mixtures thereof for purposes of the invention.

The invention further relates to the metal chalcogenide electrode and the complete photoelectrochemical system including an electrolyte which may be formed using the above process. The invention likewise relates to the treatment of semiconductors generally by the process.

According to another aspect of the invention, a process for the surface treatment of metal chalcogenides is disclosed. This technique may be used independently of whether a photoelectrochemical etching step is first performed. In this process, a metal chalcogenide is immersed in an aqueous solution of Zn and/or Cr ions. The metal chalcogenide is then immersed in a solution containing chalcogenide (including polychalcogenide) ions to form the sulfide which remains on the semiconductor.

The process may further include the step of inserting the chalcogenide in a photoelectrochemical cell and connecting the metal chalcogenide as an electrode within the cell. As noted previously, the metal chalcogenide may be etched prior to ion treatment. The invention, further includes the photoelectrochemical electrode produced by the process.

The concentrations of the etching solution as well as of the ion treatment solution are not critical and may typically range from 0.1 M to about 1 M.

DESCRIPTION OF PREFERRED EMBODIMENTS

The invention relates to a process for the photoelectrochemical etching of bodies of metal chalcogenide semiconductors as well as to metal ion treatments of such etched semiconductors. The etching according to the invention results in a substantially non-reflecting matte surface. Such a surface is preferred for photovoltaic purposes as it reduces reflection and thus photocurrent losses. Thus, using such a technique may obviate the need for an anti-reflection coating in a solid state photovoltaic cell. In photoelectrochemical cells, where provision of an anti-reflection coating is normally not feasible, the advantage of such a non-reflecting surface is even more pronounced. When a semiconductor layer which has undergone a prior process of photoelectrochemical etching according to the invention is used in a photoelectrochemical cell, an increase of all output parameters is noted. Photocurrent typically increases by about 20-25%. This increase is due in part to decreased reflection of the light and also to improved surface electronic properties. Fill factor typically increases by about 10%. Photovoltage change is less predictable, but it also often increases substantially after the photoelectrochemical etch.

It has been further found that the addition of certain metal ions to the photoelectrochemical etching solution often has a beneficial effect on the output parameters of the semiconductor when such semiconductors are used as electrodes in photoelectrochemical cells. Ions which may be used include $Ce^{4+}$, $Sn^{2+}$, $Sn^{4+}$, $Zn^{2+}$, $Cr^{6+}$, $Fe(CN)_6^{4-}$, and $Fe(CN)_6^{3-}$.

Zn and Cr are particularly preferred in that they increase photovoltage when such semiconductors are subsequently immersed in a polychalcogenide electrolyte such as is used in photoelectrochemical cells. This treatment may be performed either during photoetching or as a separate subsequent step. This improvement is independent of the above etching treatment.

According to one embodiment of the invention, the semiconductor to be etched is in the form of an electrode provided with an electrical contact means. The semiconductor electrode is connected, preferably via an ammeter, to a second inert electrode which may be made of carbon or a metallic material and which is chemically inert towards the electrolyte. The particular second electrode used is of little consequence (except that it must be substantially chemically inert in the etching solution and function acceptably as an electrode.) The two electrodes are then immersed in an aqueous solution for etching. Although aqueous solutions are preferred, other solutions are possible. The aqueous solution is preferably acidic. Acid concentration is not critical. However, the acid should not be so strong as to chemically attack the semiconductor at an appreciable rate in the dark. As an example, 0.1 N $H_2SO_4$ is suitable for etching many materials. However, other acids, or acidic salts (such as $CrO_3$ in water) will, depending upon the case, work as well or even better. While acid solutions have been used, non-acidic solutions which do not fully stabilize the photoelectrodes, i.e., any solution which allows photoelectrochemical corrosion to occur, may also be used. For example, neutral $K_3Fe(CN)_6$/$K_4Fe(CN)_6$ solutions have been found to be effective.

The immersed semiconductor is then illuminated to effect etching. While the illumination level itself is not critical, light intensities in the vicinity of sunlight intensity are generally suitable. The photocurrent passing through the semiconductor can be read directly on the ammeter.

Photocurrents through the ammeter will depend upon the illumination intensity as well as upon the semiconductor itself. Generally, illumination levels which give 5-20 mA/cm$^2$ of photocurrent for a given system are suitable although this range is only given by way of example and large variations outside this range may likewise be used.

In certain systems, the photocurrent will sometimes increase to a maximum and then begin to decrease. In this case, the semiconductor electrode is preferably removed from the electrolyte when such a maximum has been reached.

However, generally, photocurrents begin to decrease immediately upon illumination. In such a system, the extent of photoetching is best established for each system by experiment. As an example, it has been found that for an initial photocurrent density of 10-20 mA/cm$^2$, illumination for about 5 seconds provides suitable photoetching. Subsequent to etching, the semiconductor surface is then rinsed with water.

Quite obviously, the invention is not limited to the particulars disclosed and alternative embodiments are likewise possible. Thus, a second electrode may be connected directly to the semiconductor electrode without the interposition of an ammeter. In fact, the second electrode of the system may comprise the substrate to which the semiconductor is electrically connected. It is even possible to photoetch using "local cells" existing within the semiconductor itself. Thus, local areas of the semiconductor may act as the counterelectrode. It is further possible to etch a semiconductor powder according to the process of the invention wherein the electrochemical reactions which occur at each electrode during etching of the semiconductor, i.e., oxidation and reduction, occur at different sites on a given particle. In such internally connected embodiments, photocurrent flowing between the electrodes is obviously difficult or impossible to measure.

As a result of photoetching, the semiconductor surface usually becomes matte, i.e., the surface exhibits substantially reduced reflectivity.

According to yet another aspect of the invention, it has been found beneficial to treat semiconductor surfaces with Zn or Cr ions. Although this supplemental ion treatment may be used together with the previous photoetching steps, the ion treatment may likewise be used independently of such an etch to provide improved results.

When using the ion treatment in conjunction with the photoetch process, certain metal ions are added to the electrolyte. The electrolyte may comprise a very dilute acid solution, e.g., in the range of 0.1 N. Also, it is preferable in certain instances not to rinse the semiconductor after ion treatment. Such precautions are particularly important if $Zn^{2+}$ ions are used and are critical to a lesser extent for $Cr^{6+}$ ions. In other cases, such as when $Ce^{4+}$ or $Sn^{2+}$ ions are used, it is preferable to rinse the surface after ion treatment.

Also, even in these instances where no special ion treatment is performed, it may be desirable to rinse the semiconductor to remove chalcogens which form as a result of the etching and which may act as insulators in solid state applications.

Treatment of semiconductor surfaces by Zn or Cr ions (or their complex ions) is beneficial independent of whether or not a preliminary photoelectrochemical etch is used. In such a process the semiconductor may be dipped into a $Cr^{6+}$ ion solution, e.g., $K_2CrO_4$, followed by rinsing. Since rinsing is not always necessary, where not required, such rinsing may be omitted. Immersion of the electrode in a chalcogenide or polychalcogenide electrolyte, such as polysulfide, serves to activate it. Increased voltages typically on the order of about 10% usually result from such treatment when the semiconductor is used as a photoelectrode in a polysulfide electrolyte. A similar treatment with $Zn^{2+}$ ions leads to an increase in the photovoltage which may reach on the order of about 20%.

When adding zinc ions (including complex ions), the Zn solution should not be rinsed off completely. If the rinsing step is completely omitted, a white layer of ZnS may remain on the surface of the semiconductor when it is immersed in a polysulfide solution. This layer may lower output. Thus, in this instance it is preferable to perform a light rinse on the order of about 1–2 drops of water per $cm^2$ of semiconductor. Such a rinse usually gives optimum results when a concentrated zinc ion treatment solution ($> 1$ M) of $Zn^{2+}$ is used. The particular material used to provide the Zn ions is not important and Zn salts as well as complex ions all work equally as well.

Although the invention has proven itself particularly effective in electrodes used as photoelectrodes in semiconductor-electrolyte junction systems, the properties which lead to improved "photovoltaic" properties of the semiconductors used as photoelectrodes often cause an improvement in semiconductors used as solid-state photovoltaic devices where the junction is formed with another solid instead of with an electrolyte. Thus, the lowered reflectivity and improved surface electronic properties provided by the process of the invention particularly achieve improved results with electrodes which are to be used in solid-state cells as well as in photoelectrochemical cells. The improved surface electronic properties referred to seem to be related to the reduction of surface recombination of photogenerated charge carriers, although applicants do not wish to be bound by any particular theory.

EXAMPLES

1. CdSe

A layer of CdSe on Cr-plated stainless steel is prepared by coating a pre-oxidized Cr-plated steel substrate with a CdSe paste. The coated substrate is then sintered (see U.S. patent application Ser. No. 173,814 filed July 30, 1980). This layer is etched for five seconds in 3% Br/ethanol. When tested in a photoelectrochemical cell having an electrolyte 1 M in each of KOH, $Na_2S$ and S, the cell gives a short circuit current (S.C.C.) of 6.7 mA, an open circuit voltage (O.C.V.) of 631 mV, and a maximum power voltage ($P_{max}$) of 423 mV over 90 ohms using an electrode having an exposed surface area of 0.9 $cm^2$ in 0.93 AM1 simulated sunlight. This corresponds to 1.99 mW, or 2.3% conversion efficiency with a fill factor of 0.47.

By way of comparison, the CdSe electrode is then connected externally to a carbon rod and both electrodes are immersed in a 2.5% aqueous solution of $HNO_3$. The CdSe electrode is then illuminated for 5 seconds with the same light intensity as previously. After rinsing, the electrode is again tested, and gives 10 mA S.C.C., 610 V O.C.V. and 394 mV over 50 ohms which correspond to 3.1 mW $P_{max}$ resulting in a conversion efficiency of 3.6% with a fill factor of 0.51.

2. $CdSe_{0.65}Te_{0.35}$

A powder composition of $CdSe_{0.65}Te_{0.35}$ is prepared by sintering together a mixture of CdSe and CdTe in a 65/35 molar ratio with $CdCl_2$. The mixture is applied as a paint with $CdCl_2$ and nonionic detergent in water to 1 $cm^2$ of a Ti substrate which is previously preheated at 650° C. for 45 seconds in an argon stream containing about 20 ppm $O_2$. The coated substrate is annealed for 12 minutes under the same conditions during which time the $CdCl_2$ is evaporated. After annealing, the coated substrate is etched for 5 seconds in 30% $HNO_3$ in HCl solution. The active area is reduced to 0.55 $cm^2$ by painting with a solution of tar in trichloroethylene. The resulting layer, when tested under the same conditions as in Example 1, but at 0.85 AM1 light intensity, gives 6.9 mA S.C.C., 530 mV O.C.V., and 361 mV over a load of 82 ohms. This corresponds to a power of of 1.59 mW, a conversion efficiency is 3.4% and a fill factor is 0.44.

By way of comparison, this electrode may then be connected externally to a graphite electrode, both electrodes being immersed in a 2 M $SnCl_2$ aqueous solution in 1 M HCl and illuminated by simulated 0.85 AM1 for 30 seconds and then rinsed. The electrode is then immersed for a few seconds in a 0.5 M aqueous solution of $K_2CrO_4$ and patted dry with an absorbant tissue. When tested as previously, the electrode yields 10.3 mA S.C.C., 640 mV O.C.V. and 450 mV over 55 ohms. This is a power of 3.68 mW and corresponds to a conversion efficiency of 7.9% with a fill factor of 0.56.

Thus, it is seen that the photoetch treatment results in sharply improved power conversion efficiency and fill factor and short circuit current.

3. CdS

A 1 $cm^2$ CdS layer on Ti is prepared by applying a paint of $CdS:CdCl_2$ (50:3) in an aqueous 5% nonionic detergent to a Ti substrate and is treated and annealed as in Example 2. The layer is etched for 5 seconds in a 1:1 V/V $HCl:H_2O$ solution. When tested as in Example 1, but with an electrolyte containing 1 M KOH, 2 M $Na_2S$ and 0.2 M S with a light intensity equivalent to 0.5 AM1, the CdS layer gives 1.1 mA S.C.C., 475 mV O.C.V. and 325 mV over 420 ohms. This corresponds to 0.25 mW, 0.48 fill factor, and 0.5% conversion efficiency. This CdS layer is then photoetched as in Example 1, but in an aqueous solution of $CrO_3^=$ ions containing 0.5 g $CrO_3^=$ in 25 ml $H_2O$ for 15 seconds in 0.5 AM1 simulated illumination. The CdS is rinsed, and then tested as before. It then yields 1.43 m S.C.C., 535 mV O.C.V. and 362 mV over 320 ohms. The power is thus 0.41 mW, with a 0.54 fill factor and 0.82% conversion efficiency.

Once again, the photoetching treatment results in greatly improved conversion efficiency.

4. $CuInS_2$ $CuInS_2$ is prepared from the elements by heating stoichiometric quantities in an evacuated silica tube at 1150° C. for one day. The product is ground, and mixed with 8% $InCl_3$ in a 5% aqueous nonionic detergent mixture to give a smooth paint. This mixture is applied to a 1 $cm^2$ Ti substrate which has been preheated as in Example 3, and annealed under the same conditions as in Example 3, followed by 5 min. in a 1:2 $H_2$:Ar atmosphere at 250° C. This layer is marked off to 0.18 $cm^2$ with a solution of tar in trichloroethylene, and etched for 5 seconds in 3% $HNO_3$ in HCl. When tested as in Example 1, under 0.85 AM1 simulated illumination it gives 194 microamperes S.C.C., 97 mV O.C.V. and 52 mV over 500 ohms. This corresponds to 5.4 microW; 0.29 fill factor and 0.035% conversion efficiency. This layer is photoetched as in Example 1, but in an aqueous solution of 0.1 M $Ce(SO_4)_2$ in 0.1 M $H_2SO_4$ for 30 seconds at 0.85 AM1 illumination. When tested again, the electrode gives 223 microamperes S.C.C., 103 mV O.C.V., and 55 mV over 400 ohms. This corresponds to 7.56 microwatts, 0.33 fill factor and 0.049% conversion efficiency).

5. CdSe

CdSe is cathodically electroplated from an aqueous acidic electrolyte containing $CdSO_4$ and $SeO_2$, onto 1 $cm^2$ Ti preheated as in Example 3, and annealed for 10 minutes at 634° C. in argon containing 20 ppm $O_2$ and water vapor. It is then etched for 5 seconds in 3% $HNO_3$ in HCl. When tested as in Example 1, it yields under 0.95 AM1 illumination, 7.8 mA S.C.C., 575 mV O.C.V. and 395 mV over 80 ohms. This corresponds to 1.95 mW, 0.43 fill factor and 2.05% conversion efficiency.

The CdSe on the bare Ti substrate is then illuminated (0.95 AM1) in 0.1 M $K_3Fe(Cn)_6$ and 0.5 M $K_4Fe(CN)_6$ in $H_2O$ for 30 seconds. The electrode now yields 8.9 mA S.C.C., 580 mV O.C.V. and 398 mV over 65 ohms. This corresponds to 2.44 mW, 0.47 fill factor and 2.57% conversion efficiency.

The CdSe is then immersed for several seconds in 1 M aqueous $ZnCl_2$ solution, and carefully rinsed with one drop of water. The electrode now yields 8.9 mA S.C.C., 635 mV O.C.V. and 410 mV over 63 ohms. This corresponds to 2.67 mW, 0.47 fill factor and 2.8% conversion efficiency. An additional dip in a 0.5 M aqueous solution of $K_2CrO_4$, followed by rinsing, increases the O.C.V. to 655 mV, and the conversion efficiency to 2.89%, the other parameters remaining the same.

While the invention has been described with respect to metal chalcogenides as the semiconductor material, the treatment also extends to other semiconductor materials such as III-V compounds e.g. GaAs.

We claim:

1. A process for pretreating the surface of a metal chalcogenide semiconductor body for use in a cell wherein said chalcogenide is selected from the group consisting of sulfur, selenium, and tellurium, said process comprising the steps of:
   (a) immersing said metal chalcogenide semiconductor body in a suitable electrolyte, said electrolyte being selected such that said metal chalcogenide semiconductor body is relatively stable therein in the dark, but unstable as a photoelectrode under illumination;
   (b) providing a connection of said chalcogenide semiconductor body to an electrode;
   (c) immersing said electrode along with said metal chalcogenide semiconductor body in said electrolyte;
   (d) illuminating said metal chalcogenide semiconductor body to photoelectrochemically etch said metal chalcogenide semiconductor body, thus improving the surface electronic properties of said metal chalcogenide semiconductor body;
   (e) removing said metal chalcogenide semiconductor body from said electrolyte after achieving a maximum improvement of the surface electronic characteristics by the photoelectrochemical etch process of step (d); and
   (f) inserting the metal chalcogenide semiconductor body of step (e) into said cell as a component thereof.

2. The process as defined by claim 1 wherein said metal chalcogenide semiconductor body internally comprises said electrode of step (b), being thus automatically connected to said electrode.

3. The process as defined by claim 2 wherein said metal chalcogenide semiconductor body is in the form of a powder, each particle of which comprises anodic and cathodic sites exposed to said electrolyte.

4. The process as defined by claim 1 wherein said electrolyte is a dilute acid.

5. The process as defined by claim 4 wherein said dilute acid is selected from the group consisting of $H_2SO_4$, HCl, $HNO_3$ and mixtures thereof.

6. The process as defined by claim 1 further comprising adding at least one of the ions selected from the group consisting of $Ce^{4+}$, $Sn^{2+}$, $Sn^{4+}$, $Zn^{2+}$, $Cr^{6+}$, $Fe(CN)_6^{4-}$, and $Fe(CN)_6^{3-}$ to said electrolyte.

7. The process as defined by claim 1 further comprising treating said metal chalcogenide semiconductor body of step (d) in a solution comprising ions of a member selected from the group consisting of zinc, chromium or mixtures thereof.

8. The process as defined by claim 1 wherein said chalcogenide semiconductor body is selected from the group consisting of cadmium, mercury or zinc chalcogenides, alloys of said cadmium, mercury or zinc chalcogenides, and compounds having chalcopyrite structure.

9. The process as defined by claim 8 wherein said chalcopyrite structure compound is selected from the group consisting of $CuInS_2$ and $CuInSe_2$.

10. A photoelectrochemical cell comprising an electrolyte and a metal chalcogenide electrode produced by the process of claim 1.

11. The process as defined by claim 1 wherein said cell is a solid state photovoltaic cell.

12. The process as defined by claim 1 wherein said cell is a photoelectrochemical cell.

13. The process as defined by claim 1 wherein said cell is a photoelectrochemical cell comprising a polychalcogenide electrode.

14. A process for the surface treatment of metal chalcogenide semiconductor bodies wherein said chalcogenides are selected from the group consisting of sulfur, selenium, and tellurium, said process consisting of the ion treatment steps of:
   (a) immersing said metal chalcogenide semiconductor body in an aqueous solution comprising ions selected from the group consisting of the elements Zn, Cr, and mixtures thereof; and (b) then immersing said metal chalcogenide semiconductor body of step (a) in a solution containing chalcogenide ions.

15. A process for the pretreatment of metal chalcogenide semiconductor bodies, wherein said chalcogenide is selected from the group consisting of sulfur, selenium, and tellurium, comprising the steps of:
   (a) placing said metal chalcogenide semiconductor body, electrically connected to a second electrode, in an electrolyte solution;
   (b) exposing the metal chalcogenide semiconductor body to light, whereby the surface of the metal chalcogenide semiconductor body is etched;
   (c) removing the metal chalcogenide semiconductor body from the solution after achieving a maximum improvement of the surface electronic characteristics by the etching process of step (b); and
   (d) placing the metal chalcogenide semiconductor body into a photoelectrochemical cell for use as a photoelectrode.

16. The process as defined by claim 15 comprising treating the metal chalcogenide semiconductor body after step (b) is completed with ions selected from the group consisting of $Ce^{4+}$, $Sn^{2+}$, $Zn^{2+}$, $Cr^{6+}$, or mixtures thereof, by adding these metal ions to the electrolyte in which etching is achieved.

17. The process as defined by claim 15 comprising measuring the current between the two electrodes during step (b).

18. A process for the pretreatment of metal chalcogenide semiconductor bodies comprising the steps of:
   (a) adding metal ions from the group consisting of $Ce^{4+}$, $Sn^{2+}$, $Sn^{4+}$, $Zn^{2+}$, $Cr^{6+}$, $Fe(Cn)_6^{3-}$, $Fe(CN)_6^{4-}$ or mixtures thereof, to a suitable electrolyte solution;
   (b) inserting the metal chalcogenide semiconductor body to be treated into said electrolyte solution; and
   (c) removing the treated metal chalcogenide semiconductor body; wherein (a) and (b) are the only ion treatment steps applied to said body.

19. The process as defined by claim 18 wherein the ions added during step (a) are $Ce^{4+}$ and/or $Sn^{2+}$, and wherein the metal chalcogenide semiconductor is rinsed after step (c).

20. A photoelectrochemical cell comprising a chalcogenide electrode, the chalcogenide being selected from the group consisting of sulfur, selenium, and tellurium; said electrode being photoelectrochemically etched prior to regular use in the photoelectrochemical cell; said etching taking place in a dilute-acid electrolyte solution.

21. The photoelectrochemical cell as defined by claim 20 wherein the chalcogenide metal electrode has also been treated in a solution of metal ions from the group consisting of $Ce^{4+}$, $Sn^{2+}$, $Zn^{2+}$, $Cr^{6+}$, or mixtures thereof, after being etched, but before use in said cell.

22. A photoelectrochemical cell comprising a metal chalcogenide semiconductor electrode, wherein the chalcogenide is selected from the group consisting of sulfur, selenium, or tellurium, wherein said chalcogenide semiconductor electrode has been treated in a solution of metal ions from the group consisting of $Ce^{4+}$, $Sn^{2+}$, $Sn^{4+}$, $Zn^{2+}$, $Fe(CN)_6^{4-}$, $Fe(CN)_6^{3-}$ or mixtures thereof prior to its use in said photoelectrochemical cell.

23. A solid-state photovoltaic device comprising a metal chalcogenide semiconductor, wherein said chalcogenide is selected from the group consisting of sulfur, selenium, and tellurium, which semiconductor has been photoelectrochemically etched prior to use in a photoelectrochemical cell containing a dilute-acid electrolyte solution so as to maximize its surface-operating electronic characteristics.

24. The solid-state photovoltaic device as defined by claim 23 wherein the metal chalcogenide semiconductor, after etching, and before use in a photovoltaic device, is treated in an electrolyte solution containing metal ions from the group consisting of $Ce^{4+}$, $Sn^{2+}$, $Sn^{4+}$, $Zn^{2+}$, $Cr^{6+}$, $Fe(CN)_6^{4-}$, $Fe(CN)_6^{3-}$, or mixtures thereof.

25. A solid-state photovoltaic device comprising a metal chalcogenide semiconductor, wherein said chalcogenide is selected from the group consisting of sulfur, selenium, or tellurium, which semiconductor has been treated in a solution of metal ions from the group consisting of $Ce^{4+}$, $Sn^{2+}$, $Sn^{4+}$, $Zn^{2+}$, $Cr^{6+}$, $Fe(CN)_6^{4-}$, $Fe(CN)_6^{3-}$ or mixtures thereof prior to its use in a photovoltaic cell.

26. A process for pretreating the surface of a metal chalcogenide semiconductor powder for use in a cell wherein said chalcogenide is selected from the group consisting of sulfur, selenium, and tellurium, said process comprising the steps of:
   (a) immersing the said metal chalcogenide semiconductor powder in a suitable electrolyte, said electrolyte being selected such that said metal chalcogenide powder is relatively stable therein in the dark, but unstable as a photoelectrode under illumination, and wherein said metal chalcogenide powder internally comprises an electrode, thus being automatically connected to said electrode;
   (b) illuminating said metal chalcogenide semiconductor powder to photoelectrochemically etch said chalcogenide semiconductor, thereby improving the surface electronic properties of said chalcogenide semiconductor; and subsequently
   (c) placing the chalcogenide semiconductor of step (b) in a cell for use as a cell electrode.

27. A metal chalcogenide electrode produced by the process comprising the steps of:
   (a) immersing a metal chalcogenide semiconductor body, wherein said chalcogenide is selected from the group consisting of sulfur, selenium, and tellurium, into a suitable electrolyte, said electrolyte being selected such that said metal chalcogenide semiconductor body is relatively stable therein in the dark, but unstable as a photoelectrode under illumination;
   (b) providing electrical connection of said metal chalcogenide semiconductor body to an electrode;
   (c) immersing said electrode along with said metal chalcogenide body in said electrolyte; and
   (d) illuminating said metal chalcogenide semiconductor body to photoelectrochemically etch said chalcogenide semiconductor body, thus improving the surface electronic properties of said metal chalcogenide semiconductor body.

28. A process for the surface treatment of metal chalcogenide semiconductor bodies wherein said chalcogenides are selected from the group consisting of sulfur, selenium, and tellurium, said process comprising the steps of:

(a) immersing said metal chalcogenide semiconductor body in an aqueous solution of Zn ions; and
(b) immersing said metal chalcogenide semiconductor body of step (a) in a solution containing chalcogenide ions.

29. A process for the pretreatment of metal chalcogenide semiconductor bodies comprising the steps of:
(a) adding metal ions from the group consisting of $Ce^{4+}$, $Sn^{2+}$, $Sn^{4+}$, $Zn^{2+}$, $Fe(CN)_6^{3-}$, $Fe(CN)_6^{4-}$ or mixtures thereof, to a suitable electrolyte solution;
(b) inserting the metal chalcogenide semiconductor body to be treated into said electrolyte solution; and
(c) removing the treated metal chalcogenide semiconductor body.

* * * * *

UNITED STATES PATENT AND TRADEMARK OFFICE
CERTIFICATE OF CORRECTION

PATENT NO. : 4,386,142
DATED : May 31, 1983
INVENTOR(S) : Gary HODES et al.

It is certified that error appears in the above-identified patent and that said Letters Patent is hereby corrected as shown below:

At column 3, line 11, delete ",".

At column 10, line 11, delete "a" and substitute ---said--- therefor.

Signed and Sealed this

Twenty-fifth Day of October 1983

[SEAL]

Attest:

GERALD J. MOSSINGHOFF

Attesting Officer   Commissioner of Patents and Trademarks